United States Patent [19]

Peer et al.

[11] 4,348,284

[45] Sep. 7, 1982

[54] FILTER LEAF CONSTRUCTION

[75] Inventors: George J. Peer, Mt. Kisco, N.Y.; Robert C. Bradley, Paramus, N.J.

[73] Assignee: Multi-Metal Wire Cloth Inc., Tappan, N.Y.

[21] Appl. No.: 223,821

[22] Filed: Jan. 9, 1981

[51] Int. Cl.$^3$ .............................................. B01D 39/12
[52] U.S. Cl. ..................................... 210/486; 210/499
[58] Field of Search ................ 210/486, 499, 331, 346

[56] References Cited

U.S. PATENT DOCUMENTS

| | | | |
|---|---|---|---|
| 1,717,313 | 6/1929 | D'Olier | 210/499 |
| 2,346,885 | 4/1944 | Williams et al. | 166/5 |
| 2,409,705 | 10/1946 | Reinhardt | 210/486 |
| 2,443,087 | 6/1948 | Ulrich | 210/486 X |
| 2,788,901 | 4/1957 | Boeddinghaus et al. | 210/486 |
| 3,169,111 | 2/1965 | Rose et al. | 210/247 |
| 3,438,505 | 4/1969 | Luthi | 210/486 |
| 3,716,144 | 2/1973 | Bartlow | 210/499 |
| 3,941,703 | 3/1976 | Binard | 210/499 |

Primary Examiner—Thomas G. Wyse
Attorney, Agent, or Firm—Pennie & Edmonds

[57] ABSTRACT

A pressure or vacuum filter leaf for use in separating solids from liquids includes a filter medium which is constructed of a pair of filtering screens each having a plurality of widely spaced support wires, and a plurality of closely spaced surface wires extending generally perpendicular to the support wires and connected thereto along one side of the support wires. The surface wires have a wedge shaped cross-section with the apex of the wedge connected to the support wires. The opposite flat surface of the wedge of each surface wire is disposed in a flat plane with the spacing between each surface wire forming narrow filtering slots extending along the plane. The filtering screens are connected together in opposed relationship with the surface wires of each screen in spaced relation to form an internal chamber. The flat surfaces thereof face away from each other and the support wires of each screen are disposed between the surface wires of the screens. A binder extends around the entire periphery of the filtering screens and seals the periphery against flow of liquid therethrough. A filter outlet is connected to the binder and has an opening in communication with the internal chamber to permit passage of the fluid from the internal chamber.

20 Claims, 10 Drawing Figures

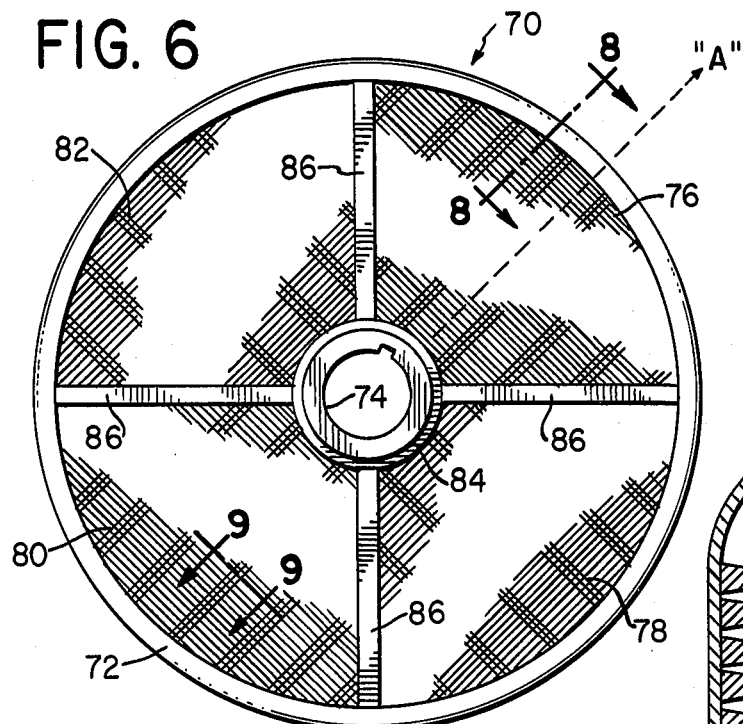
FIG. 6
FIG. 7
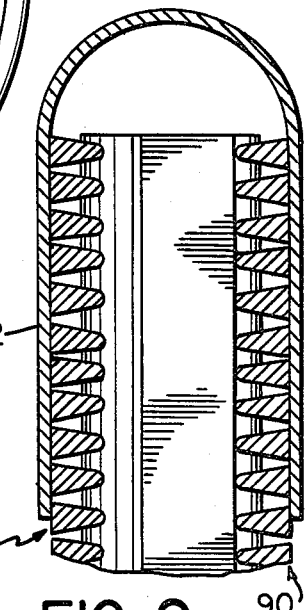
FIG. 8
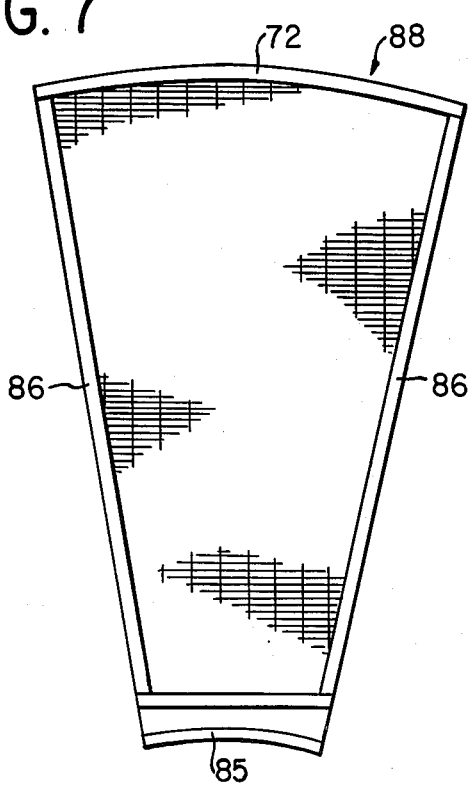
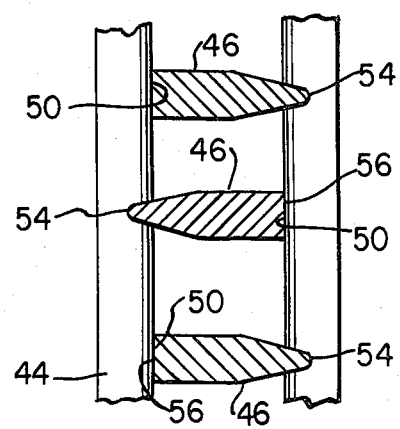
FIG. 9

FILTER LEAF CONSTRUCTION

TECHNICAL FIELD

This invention relates to filter leaves, and in particular to pressure or vacuum filter leaves or sectors for disc filters employed in separating solids from liquids.

BACKGROUND ART

It is well known to use pressure or vacuum filter leaves inside of a tank or pressure vessel for liquid-solid separation. Typically, a pressure or vacuum filter leaf is two-sided and includes a filter medium, a spacing screen, a chamber frame, a binder or closure and an outlet. The filter medium forms both of the outside filtering surfaces of the filter leaf. A chamber through which liquid flows is defined on the inside of the filter leaf by a chamber frame positioned between both of the filtering surfaces. Typically, both the filter medium and the chamber frame are constructed of a wire mesh configuration. If desired, a spacing screen can be positioned between the chamber frame and each of the filter mediums. The spacing screen may also be constructed of wire cloth or a thin perforated sheet of metal or plastic. A binder or closure which is shaped and configured to envelop the entire outside edge of the leaf holds the leaf together and provides the rigidity necessary for the leaf. The filter medium can be attached to the filter leaf by conventional welding, crimping, bolting or riveting methods or, in the case of non-metallic materials, as a bag which envelops the entire leaf. An outlet is provided which allows discharge of the filtered liquid through an outlet manifold. The outlet may be at or near the center of the leaf, or alternatively along the periphery of the leaf.

In use, the filter leaves of the above-noted construction are positioned within a tank such as a pressure vessel and are connected to a manifold type discharge. The material to be separated into its liquid and solid components is allowed to flow into the tank under pressure and separation takes place on the filtering surfaces of the pressure filter leaves.

Vacuum filter leaves, which are similar in construction to pressure filter leaves, function in the same manner as do pressure filter leaves except that they employ a vacuum which is applied to the chamber of the leaf instead of the pressure which is applied to the outside filtering surfaces.

In both pressure and vacuum filter leaves the filtered liquid flows through the leaf, into the chamber therein and out the discharge manifold. If desired, a "filter aid", such as diatomaceous earth, is placed into the tank so as to coat the filter leaves before commencement of filtration. The "filter aid" helps to regulate the filtration of particles having a predetermined size. Operation of the pressure or vacuum filter may be on a continuous or batch type operation.

After a suitable amount of filtration has occurred or periodically, the filter leaves are cleaned, in either of two methods, of the particulant matter which cakes or deposits on the filtering surfaces. According to a wet cake discharge method, the material collected on the leaves can be discharged by allowing pressure to drop followed by spraying, i.e., sluicing the filter leaves with a liquid to wash off the solids from the filter leaves. Alternatively, in the dry cake discharge method, the cake is first dried and then blown off from the filtering surfaces with air. After the air is blown on the outside of the leaf, the leaf can also be brushed, scraped or vibrated so as to remove caked material.

Alternatively, pressure or vacuum filter leaves can be constructed in the form of sectors which are placed side by side to form a 360 degree circle around a central shaft through which the vacuum is supplied. Vacuum disc filter sectors are sometimes constructed of plastic with a plastic bag serving as the filter medium. Typically, there may be one or preferably more such circles of sectors on the same central outlet. The filter rotates in a vat containing the liquid and solid to be separated, with the lower half of the filter submerged in the vat. As the filter rotates, solids are drawn against the filter medium of each submerged sector. Liquids pass through the sector and out along the central outlet. As is the case with pressure filter leaves, the sectors periodically and in some cases during each complete rotation of the sector, must be cleaned to dislodge solids or particles from the filter medium. These solids can be removed when the sector rotates out of the vat and before the sector is again submerged. This cleaning can be performed with gas, steam or liquid.

The filter leaves constructed as described above have disadvantages which result from that type of construction. Since the filter medium, chamber frame and spacing screens are typically of an interwoven, preferably wire mesh configuration, these meshes provide numerous tortious paths which tend to clog with particles which are to be separated from the liquid. Also, such meshes do not readily or easily permit removal of any cake buildup. Likewise, "filter aid" material often becomes trapped within the mesh and after excessive trapped buildups may result in reduced efficiency of filtration as well as offering resistance to removal of the "filter aid". Additionally, such filter leaves are not suitable for "back-flushing" removal of the caked or deposited material on the filtering surfaces of the filter leaf, i.e., by flowing an incompressible and/or compressible fluid in a direction opposite to the flow of separated liquid, since these filter leaves tend to blow-out during "back-flushing". Also, such filter leaves are often damaged or wear quickly because of the use of brushes or scrapers to clean the filtering surfaces and, furthermore, are particularly subject to damage in the event a doctor blade is used to clean the filtering surface.

Although filter screens are known which employ single wedge wire screens, such filter screens have not replaced known pressure filter leaves as described above. In particular, it is known from U.S. Pat. Nos. 1,177,313; 2,346,885 and 3,941,703 to employ a single flat or cylindrical wedge wire screen as the filter medium for straining well water or for dewatering or washing coal ores and the like. Wedge wire screens are described in greater detail in U.S. Pat. Nos. 3,169,111 and 3,716,144 which illustrate various constructions of wedge wire screens. However, as noted in U.S. Pat. No. 3,941,703 such flat wedge wire screen surfaces are not preferred for high pressure filtration.

DISCLOSURE OF THE INVENTION

According to the present invention, wedge wire screens each having a filtering surface and an oppositely facing supporting surface are positioned in reverse opposed facing relation in a pressure or vacuum filter leaf or sector so as to serve as the filter medium for separating solid material from a liquid. Accordingly, the wedge wire screens are placed in a back to back relationship in a filter leaf or sector, so that the supporting surfaces are on the inside of the leaf or sector and the filtering surfaces are on the outside. The chamber of the leaf filter is defined between the opposed facing supporting surfaces. Each filtering surface has a plurality of slots communicating with the chamber and dimensioned in accordance with the size of the solid material to be separated so as to substantially permit passage of the liquid but not the solid material through the slots into the chamber.

In a preferred embodiment, each wedge wire screen comprises a plurality of widely spaced apart support wires, and a plurality of closely spaced apart surface wires extending generally transversely to the support wires and connected thereto along one side of the support wires. Each of the surface wires has a generally wedge shaped cross-section with the apex of the wedge connected to the support wires. The opposite flat surface of the wedge of each surface wire is disposed such that narrow filtering slots are formed between adjacent surface wires. The width of the slots is generally constant. The apexes and opposite flat surfaces of the surface wires define the supporting and filtering surfaces, respectively, for each wedge wire screen.

Preferably, the plurality of surface wires are positioned generally parallel to each other with the flat surface of the wedge of each surface wire lying in a generally flat plane. The support wires are positioned generally perpendicularly to the surface wires and each support wire also has a generally wedge shaped cross-section with its apex welded to the respective apexes of the surface wires.

In one embodiment of the present invention, the wedge wire screens are positioned such that the flat surfaces of each support wire of one wedge wire screen are spaced generally opposite and apart from corresponding flat surfaces of the support wires of the other wedge wire screen.

In an alternative embodiment of the present invention, the wedge wire screens are positioned together such that the flat surfaces of the support wires of each wedge wire screen are contiguous to the respective apexes of the surface wires of the other wedge wire screen. Preferably, a plurality of the flat surfaces of the support wires of each wedge wire screen are welded to the respective apexes of the surface wires of the other wedge wire screen.

A binder having a generally U shaped channel configuration is adapted for liquid-tight engagement with portions of the filtering surfaces adjacent the periphery of the filter leaf. In a preferred construction, the binder is continuously tack welded to portions of the filtering surfaces adjacent to the periphery of the filter leaf so as to provide a liquid-tight seal along the welded portions.

The filter leaf can be constructed of a generally rectangular configuration with a filter outlet connected to the binder and having an opening in communication with the chamber. Preferably, the plurality of support wires are parallely aligned in a direction toward the filter outlet. Alternatively, the filter leaf can be circular having a filter outlet disposed centrally of the filter leaf with an opening communicating with the chamber. Each wedge wire screen is partitioned into a plurality of sectors each of which has a central radial. The support wires in each sector are aligned parallel to the central radial.

BRIEF DESCRIPTION OF DRAWINGS

The present invention is described in detail below with reference to the drawings in which:

FIG. 6 is a front view of a center drain filter leaf employing wedge wire screens according to the present invention.

FIG. 7 is a front view of a sector for a vacuum disc filter employing wedge wire screens according to the present invention.

FIG. 8 is an enlarged cross-sectional view taken along the lines 8—8 of FIG. 6.

FIG. 9 is an enlarged cross-sectional view taken along the lines 9—9 of FIG. 6.

Best Mode for Carrying Out the Invention

In the description which follows, any reference to either orientation or direction is intended primarily for the purpose of illustration and is not intended in any way as a limitation of the scope of the present invention.

Figure 1:
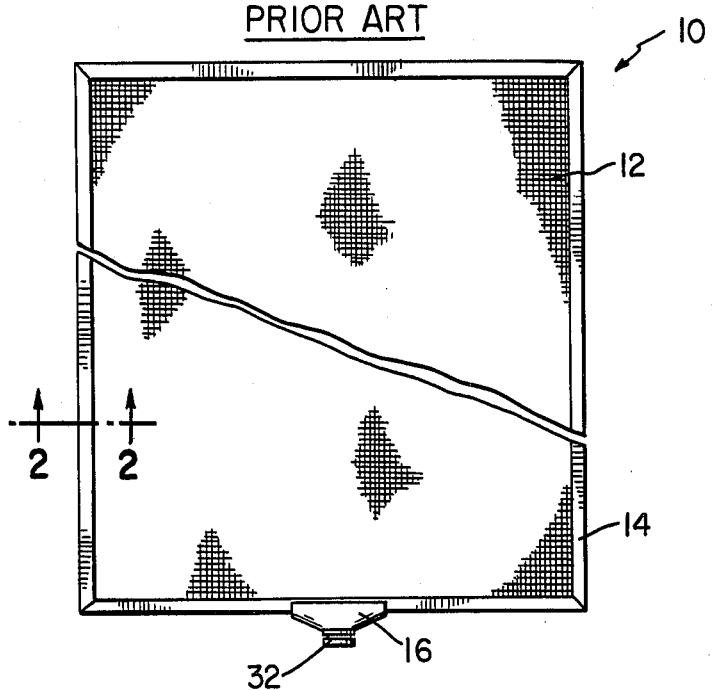
FIG. 1 is a side elevational view of a known pressure filter leaf including a filter medium of a type known to those skilled in the art.

Referring to the drawings, a known filter leaf 10 for separating solids from liquids is shown in FIG. 1 including a filter medium 12 retained in a binder or closure 14 which envelopes or surrounds the periphery of the filter medium 12. An outlet 16 is positioned in the binder 14 for discharging the liquid from the interior of the filter leaf.

Figure 2A:
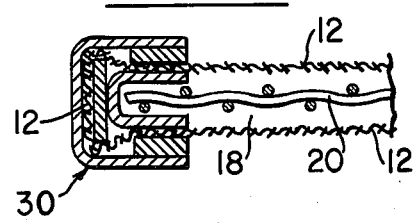
FIG. 2A is an enlarged cross-sectional view of one embodiment of the known pressure leaf taken along the line 2—2 of FIG. 1.
Figure 2B:
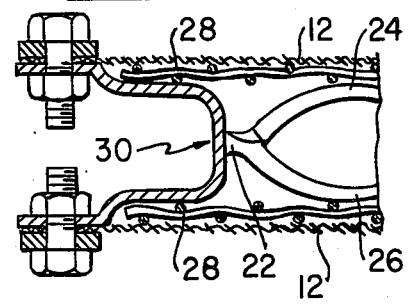
FIG. 2B is an enlarged cross-sectional view of a second embodiment of the known pressure leaf taken along the line 2—2 of FIG. 1.

As shown more clearly in FIGS. 2A-2B, the filter leaf 10 further includes a chamber 18 defined between two filter mediums 12. The filter medium 12 normally is constructed of metal wire cloth, woven plastic or natural fiber cloth or special kinds of perforated plate with double sheets using offset holes of the type which is marketed under the tradename NEVACLOG by Multi-Metal Wire Cloth Inc., 501 Route 303, Tappan, New York. NEVACLOG filters are more fully described in commonly assigned U.S. Pat. Nos. 3,052,360 and 4,234,430. The chamber 18 includes a chamber member 20 which serves to support and maintain the filter mediums 12 apart. Typically, the chamber member 20 is fabricated of a coarse wire mesh as illustrated in FIG. 2A. An alternative embodiment of a chamber member 20 is shown in FIG. 2B wherein the chamber member 20 is constructed of sheet metal 22 which is first perforated by a series of aligned slits and then formed into alternate raised upper and lower portions, 24 and 26, respectively, adjacent each slit. Such chamber member 20 as shown in FIG. 2B is of the type which is marketed under the registered trademark POR-O-SEPTA ® by Multi-Metal Wire Cloth Inc. The embodiment shown in FIG. 2B additionally includes spacing screens 28 positioned between the chamber member 20 and each filter medium 12. The spacing screens 28 which also are typically of a wire mesh construction not only contribute to the strength of the filter leaf structure but aid in spacing the filter medium 12 from the chamber frame 20 as well as providing added support of the filter medium 12 in the regions adjacent the unraised portions of the chamber frame 20. The binder 14 typically is a tubular or channel-like assembly 30 shown as alternative embodiments in FIGS. 2A and 2B. The binder 30 maintains the shape of the filter leaf 10 and particularly retains the filter mediums 12, chamber frame 20 and spacing screens 28 in their relative positions. The binder 30 is adapted to seal the periphery of the filter leaf 10 so as to prevent any leakage to or from the chamber 18 through such periphery.

In the alternative embodiment of the assembly illustrated in FIG. 2B, the spacing screens 28 and the chamber member 20 are welded along their periphery to the binder 30.

The outlet 16, connected to the binder 14 communicates with the chamber 18 and includes a neck portion 32 having an opening for passage of liquids from the chamber 18. The neck portion 32 is adapted for connection to an outlet manifold (not shown), e.g., piping, through which the liquid is carried to a work station for storage or further treatment of the liquid. Preferably, the outlet 16 is machined from stainless steel castings so as to provide a strong outlet fitting for supporting the filter leaf.

Although the filter leaf 10 as described above is shown in FIG. 1 as having a generally rectangular configuration, the filter leaf 10 can assume any desired shape, e.g., circular or oval, in accordance with the confinement requirements of the vessel within which the filter leaf 10 may be positioned. Alternatively, the filter leaf 10 can be formed of individual sections which can then be coupled into an integral unit, e.g., a circularly shaped filter leaf formed of individual sectors which are coupled to form a complete circle. The filter leaf 10 can also be formed of multi-layers of filter medium 12 and spacing screens 28. Furthermore, the filter leaf 10 can be provided with multiple outlets suitably located so as to obtain a particular liquid flow pattern as desired from the filter leaf 10.

Figure 3:
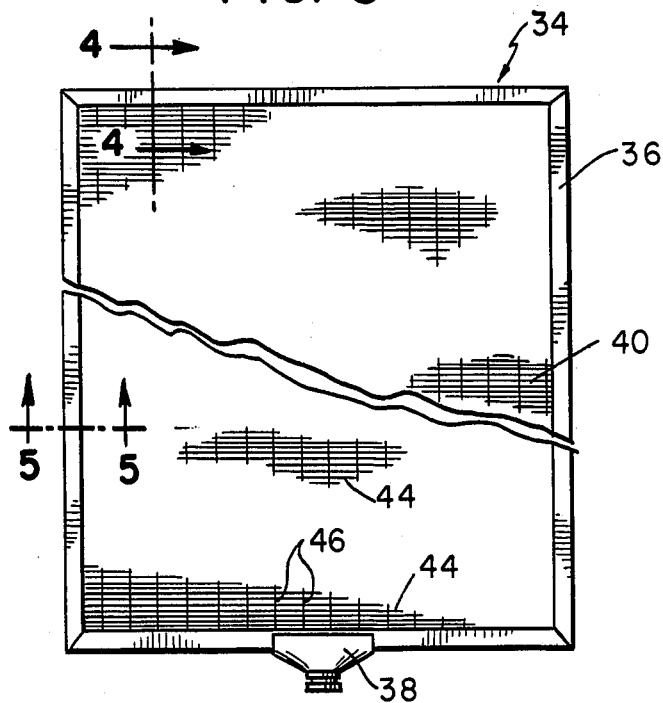
FIG. 3 is a side elevational view of a pressure filter leaf employing wedge wire screens according to the present invention.
Figure 4:
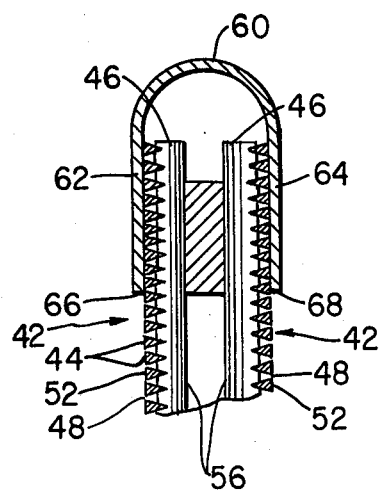
FIG. 4 is an enlarged cross-sectional view taken along the lines 4—4 of FIG. 3.
Figure 5:
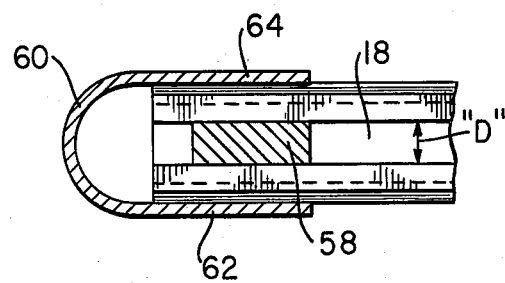
FIG. 5 is an enlarged cross-sectional view taken along the lines 5—5 of FIG. 3.

Referring now to FIGS. 3-5, a filter leaf 34 having binder assembly 36 and outlet 38 is shown employing filter mediums 40 according to the present invention. In particular, the filter leaf 34 is illustrated as incorporating the placement of wedge wire screens 42 positioned in a reverse opposed back to back relationship in place of the typical filter mediums 12, chamber member 20 and spacing screens 28 of known pressure or vacuum filter leaves or sectors.

As more clearly illustrated in FIGS. 4 and 5, wedge wire screens 42 are constructed of closely spaced metal surface wires 44 secured preferably by resistance welding to transversely and widely spaced metal support wires 46. Preferably the support wires 46 are perpendicular to the surface wires 44. Such wedge wire screens 42 are of the type marketed by Multi-Metal Wire Cloth Inc. under the registered trademark TRISLOT®. Construction of such wedge wire screens is also described in U.S. Pat. No. 3,941,703.

The shape of the surface wire 44 is preferably triangular or wedge-shaped in cross-section and the surface wires 44 are positioned alongside one another so as to provide slot-like openings 48 preferably of constant width between adjacent surface wires 44. Each surface wire 44 has an apex 50 at one end and a flat surface 52 at the opposite end which define the supporting surface and filtering surface, respectively, of the respective wedge wire screen. Preferably, the flat surfaces 52 of the filtering surfaces each lie in a flat plane. Preferably, the width of the opening 48 varies from 0.001" to 0.010" resulting in retention of particles having dimensions as small as 25 microns. Use of a "filter aid" with such wedge wire screens 42 can further reduce particle retention into the sub-micron range. The support wires or support rods 46 may be constructed of various cross-sectional dimensions which facilitate welding of the surface wires 44 at their apexes to the support wires 46 by resistance welding.

In a preferred embodiment, each support wire 46, as in the case of the surface wires 44, also is preferably triangular or wedge-shaped in cross-section such that each support wire 46 has an apex 54 at one end and a flat surface 56 at the opposite end as shown in FIG. 9. In addition, the support wires 46 are parallely aligned in a direction toward the outlet side as illustrated in FIG. 3. In this manner, the "back-flush" capability of the filter leaf is maximized.

The above-described TRISLOT® wedge wire screens 42 are capable of precise construction and controlled openings 48. Accordingly, they afford a precise regulation of the size or dimension of the solid material to be filtered from the liquid through the pressure or vacuum filter leaf 34. The sharp openings 48 obtained with the TRISLOT® wedge wire screens 42 offer a minimum resistance to fluid flow and clogging. Preferably the wedge wire screens 42 are constructed of stainless steel or other corrosion resistant metal.

Referring to one embodiment of a filter leaf according to the present invention as illustrated in FIGS. 4 and 5, a pair of wedge wire screens 42 are spaced apart such that the opposing flat surfaces 56 of respective opposing support wires 46 are spaced opposite and apart a distance indicated as "D" in FIG. 5. If desired, a frame spacer bar 58 can be positioned between the opposing flat surfaces 56 so as to regulate and establish the desired distance "D".

The binder assembly as shown in FIGS. 3 and 4 includes a generally U-shaped member 60 having projecting finger portions 62 and 64 which continuously extend over peripheral portions of both wedge wire screens 42. The finger portions 62 and 64 are welded at or just back from their leading edges 66 and 68 to the filtering surfaces of the wedge wire screens 42 so as to provide a fluid-tight seal therealong. In this fashion, liquid will flow through the slots 48 into the chamber 18 and not between the fingers 62 and 64 of the binder and the wedge wire screens 42.

Referring to FIG. 6, a rotary or circular filter leaf 70 is shown having a circular binder assembly 72 and a central discharge outlet 74. Filter leaf 70 includes four "quadrant" wedge wire screens 76, 78, 80 and 82 which are enclosed along their outer periphery by binder assembly 72 and along their inner periphery by a ring 84 positioned around central discharge outlet 74. Each quadrant wedge wire screen has a central radial as indicated, e.g., by the arrow "A" in FIG. 6. Additionally, the quadrants are further enclosed along their adjoining edges by a cover strip 86. The binder assembly 72, ring 84 and cover strips 86 preferably are continuously welded to the filtering surfaces of the wedge wire screen so as to provide a liquid-tight seal.

Preferably, the quadrant wedge wire screens 76, 78, 80 and 82 are positioned such that the support wires 46 of each quadrant are aligned parallel to each other and perpendicular to the respective surface wires 44. Furthermore, the support wires 46 of each quadrant are aligned parallel to the respective central radial. Accordingly, the surface wires 44 of each quadrant are generally transverse to the respective central radial. In this fashion, an optimum "back-flush" capability is achieved.

If desired, the circular filter leaf 70 can be formed of a greater number of sectors than that in FIG. 6.

A sector 88, as shown in FIG. 7, can be joined with other similarly configured sectors to form a complete circle with their respective outlets 85 attached to a central vacuum pipe.

Referring to yet another alternative embodiment of the present invention as illustrated in FIGS. 8 and 9, a pair of wedge wire screens 90 are positioned together in a reverse opposed back to back relationship such that the flat surface 56 of each support wire 46 of one wedge wire screen 90 is contiguous to the respective apex 50 of a surface wire 44 of the other opposed wedge wire screen 90. Preferably, some of the flat surfaces 56 of the support wires 46 of one wedge wire screen 90 are welded to the respective apexes of the surface wires 44 of the other wedge wire screen 90. Such welding together of the two wedge wire screens 90 provides additional strength to and further support of the filter leaf.

The improved filter leaves according to the present invention have numerous advantages over conventional or known filter leaves. In particular, the improved filter leaves are capable of being cleaned by "back-flushing" which is not presently available with conventional filter medium. In addition, the improved filter leaves offer a flow ratio of the back-flush flow to the influent flow of approximately 5:3 whereby lower back-flush rates or longer filtration cycles with greater flow through are achieved. By aligning the support wires such that their longitudinal axes are directed toward the filter outlet, a maximum back-flush capability is obtained. Further, since the filter medium and support structure of the improved filter leaves is of a singular construction, it is of a simpler construction and is capable of supporting itself in a vertical or horizontal position without the need for separate vertical supports or stiffeners as often required in conventional construction. In addition, the improved filter leaf contruction is capable of achieving a flatness not previously obtainable, inasmuch as conventional filter media often sag or have bulges formed on the surface because they are not rigid. Such improved construction is also capable of withstanding far higher pressure differentials than possible with a conventional construction. Advantageously, the improved filter leaf construction is capable of replacing standard type constructions without requiring any major modifications to the filter configuration.

The improved filter leaves exhibit excellent flow characteristics because of the shape of wedge wire screens as compared to a conventional filter medium. For a given liquid-solid mixture and pressure differential, the flow rate is normally greater with a smaller percentage of open surface area, than with conventional filter mediums having a greater percentage of open surface area. Furthermore, the improved filter leaves have greater resistance to clogging, i.e., blinding, because of the shape of the wedge wire screens. Since such wedge wire screen construction provides sharp orifices at the openings and thereby smooth filtering surfaces, the cake which builds on the filtering surface is easily removed. Such smooth surfaces further permit the use of brushes and scrapers without damage to the filter medium. Such improved filter leaf construction is also able to accept a pre-coat of filter aid and permit its subsequent removal without excessive blinding of the wedge wire screen or sticking of the filter aid to the filter medium itself. Further, wedge wire screens have excellent strength and exhibit greater resistance to mechanical abuse than do conventional filter media and spacing screens. Thus, repairs are made less frequently under normal operating conditions and operations can be continued for longer periods between shut-downs for cleaning and/or repairs. In addition, the improved filter leaves can be scraped for cake removal and cleaning by means of a doctor blade which often severely wears normal filter media as do other conventional cleaning methods such as brushes or paddle type scrapers.

Since the slot openings can be kept constant even with the use of different sized surface wires, it is possible with the present invention to maintain the particle retention constant while varying the percentage of the effective filtering surface area.

We claim:

1. A pressure filter assembly comprising:
   a. a first filtering screen having:
      (1) a plurality of widely spaced support wires,
      (2) a plurality of closely spaced surface wires extending generally perpendicular to the support wires and connected thereto along one side of the support wires, said surface wires having a wedge shaped cross-section with the apex of the wedge connected to the support wires and the opposite flat surface of the wedge of each surface wire being disposed in a flat plane with the spacing between each surface wire forming narrow filtering slots extending along said plane;
   b. a second filtering screen having the same construction as the first filtering screen;
   c. said first and second filtering screens being connected together in opposed relationship with the surface wires of each screen in spaced relation to form an internal chamber and with the flat surfaces thereof facing away from each other and with the support wires of each screen being disposed in said chamber between the surface wires of the screens said chamber being otherwise free of structure;
   d. a binder extending around the entire periphery of the two filtering screens and sealing the periphery against flow of fluid therethrough; and
   e. a filter outlet connected to the binder and having an opening in communication with said internal chamber.

2. A filter leaf for use in separating generally solid material from a liquid, comprising:
   a. at least two wedge wire screens each having a filtering surface and an oppositely facing supporting surface, the wedge wire screens being positioned in reverse opposed relation such that their supporting surfaces face one another and define an empty chamber therebetween, each filtering surface having a plurality of filtering slots communicating with the chamber and dimensioned in accordance with the size of the generally solid material to be separated from the liquid so as to substantially permit passage of the liquid but not the generally solid material through the slots into the chamber;

b. means for liquid-tight sealing of the periphery of the wedge wire screens so as to prevent passage of liquid through such periphery; and c. discharging means in communication with the chamber for discharging liquid out of the chamber.

3. The filter leaf according to claim 2 wherein each wedge wire screen comprises:

a. a plurality of widely spaced apart support wires; and b. a plurality of closely spaced apart surface wires extending generally transversely to the support wires and connected thereto along one side of the support wires, said surface wires each having a generally wedge shaped cross-section with the apex of the wedge connected to the support wires and the opposite flat surface of the wedge of each surface wire being disposed such that narrow slots are formed between adjacent surface wires to define said filtering slots.

4. The filter leaf according to claim 3 wherein the plurality of surface wires are positioned generally parallel to each other.

5. The filter leaf according to claim 4 wherein the support wires are positioned generally perpendicularly to the surface wires.

6. The filter leaf according to claim 5 wherein each support wire has a generally wedge shaped cross-section with its apex welded to the respective apexes of the surface wires.

7. The filter leaf according to claim 6 wherein the opposite flat surface of the wedge of each surface wire is disposed in a generally flat plane.

8. The filter leaf according to claim 7 wherein the wedge wire screens are positioned such that the flat surfaces of each support wire of one wedge wire screen are spaced generally opposite and apart from corresponding flat surfaces of the support wires of the other wedge wire screen.

9. The filter leaf according to claim 7 wherein the wedge wire screens are positioned together such that the flat surfaces of each support wire of each wedge wire screen are contiguous to the respective apexes of the surface wires of the other wedge wire screen.

10. The filter leaf according to claim 9 wherein a plurality of the flat surfaces of the support wires of each wedge wire screen are welded to the respective apexes of the surface wires of the other wedge wire screen.

11. The filter leaf according to claim 8 wherein the width of the slots is generally constant.

12. The filter leaf according to claim 11 wherein the width of the slots varies from one mil to ten mils.

13. The filter leaf according to claim 12 wherein the sealing means is a binder having a generally U shaped channel configuration adapted for liquid-tight engagement with portions of the filtering surfaces adjacent the periphery of the filter leaf.

14. The filter leaf according to claim 13 wherein the binder is continuously welded to portions of the filtering surfaces adjacent to the periphery of the filter leaf so as to provide a liquid-tight seal along the welded portions.

15. The filter leaf according to claim 14 wherein the discharging means includes at least one filter outlet connected to the binder and having an opening in communication with the chamber.

16. The filter leaf according to any one of claims 3–15 wherein the plurality of support wires are parallelly aligned in a direction toward the discharging means.

17. The filter leaf according to claim 16 wherein the filter leaf is of a generally rectangular configuration.

18. The filter leaf according to claim 14 wherein the discharging means includes at least one filter outlet disposed centrally of the filter leaf and having an opening in communication with the chamber.

19. The filter leaf according to claim 18 wherein each wedge wire screen is partitioned into a plurality of sectors each sector having a cental radial, wherein the support wires of each sector are aligned parallel to the central radial of the respective sector.

20. The filter leaf according to claim 19 wherein the filter leaf has a generally circular configuration.

* * * * *